US012675815B2

(12) United States Patent
Sohn

(10) Patent No.: US 12,675,815 B2
(45) Date of Patent: Jul. 7, 2026

(54) SERVICE PROVIDING APPARATUS AND METHOD FOR CROSS-RECOMMENDATION BETWEEN PRODUCT SALES SITES BASED ON ONLINE, SERVICE PROVIDING SYSTEM THEREFORE, AND NON-TRANSITORY COMPUTER READABLE MEDIUM HAVING COMPUTER PROGRAM RECORDED THEREON

(71) Applicant: SK Planet Co., Ltd., Seongnam-si (KR)

(72) Inventor: SangMok Sohn, Seongnam-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 172 days.

(21) Appl. No.: 18/736,617

(22) Filed: Jun. 7, 2024

(65) Prior Publication Data

US 2025/0014088 A1     Jan. 9, 2025

(30) Foreign Application Priority Data

Jul. 7, 2023    (KR) ........................ 10-2023-0088406

(51) Int. Cl.
G06Q 30/00        (2023.01)
G06Q 30/0204      (2023.01)
G06Q 30/0601      (2023.01)

(52) U.S. Cl.
CPC ..... G06Q 30/0631 (2013.01); G06Q 30/0204 (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 9,818,145 | B1 * | 11/2017 | Finkelstein | ........ G06Q 30/0631 |
| 2007/0005437 | A1 * | 1/2007 | Stoppelman | ....... G06Q 30/0601 |
| | | | | 705/26.7 |

(Continued)

FOREIGN PATENT DOCUMENTS

KR        10-2174206  B1    11/2020

OTHER PUBLICATIONS

Zhao, Boheng, "Design of e-commerce platform based on collaborative filtering recommendation algorithm", 2022 IEEE Asia-Pacific Conference on Image Processing, Electronics and Computers (IPEC), 10.1109/IPEC54454.2022.9777375 (Year: 2022).*

*Primary Examiner* — Ethan D Civan
(74) *Attorney, Agent, or Firm* — WTA IP Law P.C.

(57)        ABSTRACT

The present disclosure relates to a service providing apparatus and method for cross-recommendation between product sales sites based on online, a service providing system for the apparatus and method, and a non-transitory computer readable medium having a computer program recorded thereon for calculating and matching similarity between product categories of different product sales sites on the basis of an analysis result according to behavior history analysis of a customer for a plurality of different product sales sites based on online and the apparatus and method recommending a product on the basis of the category of a specific product sales site with high similarity to a recommendation category of another product sales site when the customer visits the specific product sales site on the basis of the matching result.

12 Claims, 7 Drawing Sheets

(56)             References Cited

U.S. PATENT DOCUMENTS

| | | | |
|---|---|---|---|
| 2016/0358122 A1* | 12/2016 | Tiwary ................. | G06Q 20/322 |
| 2021/0334875 A1* | 10/2021 | Li ....................... | G06Q 30/0631 |
| 2024/0062270 A1* | 2/2024 | Park ................... | G06Q 30/0251 |

* cited by examiner

| | A_cat_1 | B_cat_1 | A_cat_2 | B_cat_2 |
|---|---|---|---|---|
| Usr_1 | 3 | | 2.0 | 3.5 |
| Usr_2 | 4 | | 1.5 | |
| Usr_3 | | 5 | | 4.5 |
| Usr_4 | 1.5 | | 1.0 | 3.0 |

FIG. 4

<INTER-CATEGORY SIMILARITY>

|         | A_cat_1 | B_cat_1 | A_cat_2 | B_cat_2 |
|---------|---------|---------|---------|---------|
| A_cat_1 |         | 0       | 0.96    | 0.45    |
| B_cat_1 |         |         | 0       | 0.7     |
| A_cat_2 |         |         |         | 0.58    |
| B_cat_2 |         |         |         |         |

MATCHING INFORMATION

| A_cat_1 ↔ B_cat_2 |
|-------------------|
| A_cat_2 ↔ B_cat_2 |

SERVICE PROVIDING APPARATUS AND METHOD FOR CROSS-RECOMMENDATION BETWEEN PRODUCT SALES SITES BASED ON ONLINE, SERVICE PROVIDING SYSTEM THEREFORE, AND NON-TRANSITORY COMPUTER READABLE MEDIUM HAVING COMPUTER PROGRAM RECORDED THEREON

CROSS REFERENCE TO RELATED APPLICATION

The present application claims priority to Republic of Korea Patent Applications No. 10-2023-0088406, filed Jul. 7, 2023 the entire contents of which are incorporated herein for all purposes by this reference.

BACKGROUND

Technical Field

The present disclosure relates to a service providing apparatus and method for cross-recommendation between product sales sites based on online, a service providing system for the apparatus and method, and a non-transitory computer readable medium having a computer program recorded thereon. In more detail, the present disclosure relates to a service providing apparatus and method for cross-recommendation between product sales sites based on online, the apparatus and method calculating and matching similarity between product categories of different product sales sites on the basis of an analysis result according to behavior history analysis of a customer for a plurality of different product sales sites based on online and the apparatus and method recommending a product on the basis of the category of a specific product sales site with high similarity to a recommendation category of another product sales site when the customer visits the specific product sales site on the basis of the matching result.

DESCRIPTION OF THE RELATED ART

Currently, most users use online shopping malls, such online shopping malls recommend products that customers would satisfy by recording a log from which it is possible to find out behavior histories such as behaviors of individual customers checking products and putting products in a cart on the shopping malls and registering products on a bookmark, so online shopping malls show rapid growth with a considerable difference from the rate of use of offline shopping malls that cannot recommend customized products for customers because it is difficult to find out such behavior histories.

Online shopping malls that can recommend individual customized product and are different from offline shopping malls are continuously attempting to improve the recommendation service in order to increase the sale according to purchase of recommended products while increasing accuracy in product recommendation by recommending various products to customers.

However, since online shopping malls collect events related to behavior histories of customers only on the web sites that they provide, and perform product recommendation on the basis of the events, there is a problem that it is limited to collect behavior histories of customers, and accordingly, it is limited to recommend various product groups.

Further, since petty online shopping mall companies or new online shopping malls do not have sufficient data related to behavior histories according to use of the shopping malls by users, there is a problem the accuracy in product recommendation is greatly low in comparison to large-scale online shopping malls, and accordingly, they have considerable difficulty in increasing the customer acquisition rate.

SUMMARY

An objective of the present disclosure is to give support so that various and accurate products are recommended by generally considering the relationship between a behavior history at each of a plurality of different product sales sites and categories of the different product sales sites by collecting a behavior log of the customer at each of the different product sales sites, calculating a point for each product category to which products that the customer prefers pertain on the basis of the behavior log, calculating a similarity matching result by calculating similarity between the categories of the different product sales sites on the basis of the calculated points, and performing product recommendation based on a product category with high similarity between the product sales sites for the customer using the similarity matching result.

In order to accomplish the above objects, the present invention provides a service providing apparatus for cross-recommendation between product sales sites based on online, the service providing apparatus comprising: a collector configured to collect behavior log information according to use of a product sales site of a plurality of users for each of a plurality of different product sales sites that is a plurality of different web sites; an information processor configured to group items of log information, in which a user corresponding to behavior log information and a category of a product sales site corresponding to the behavior log are the same, into a log group, calculate a category point corresponding to a log group in accordance with a preset first algorithm for each of a plurality of log groups, and create category identification information for identifying a user, a product sales site, and a category corresponding to a log group and category preference information comprising a category point for each of the plurality of log groups; a matching unit configured to calculate similarity between categories in accordance with a preset second algorithm based on a plurality of items of category preference information created for a plurality of user by the information processor, and create matching information in which categories of different product sales sites are matched to each other based on the similarity; and a recommender configured to create and provide recommendation result information comprising a category of a specific product sales site matched to a category of another product sales site that a specific user prefers according to the collected behavior information based on the matching information for a user terminal of the specific user connecting to the specific product sales site.

Preferably, the first algorithm may be collaborative filtering.

Preferably, the behavior log information may comprise information about at least one of product search, adding, putting in a cart, and buying by the user.

Preferably, the second algorithm may be a cosine distance, and the matching unit may calculate a distance according to the cosine distance between a plurality of different categories according to the plurality of items of preference information, uses the calculated distance as similarity, and creates matching information by matching one or more categories to each of the plurality of different categories in a manner of matching a specific category corresponding to a specific product sales site to one or more categories in which the similarity is highest of a plurality of categories corresponding to another product sales sites.

Preferably, the recommender may select a category of another product sales site that the specific user prefers as a preference category in accordance with a preset recommendation algorithm based on one or more items of behavior log information corresponding to the another product sales site and the specific user and creates recommendation result information for recommending a product pertaining to a recommendation category by identifying a category of the specific product sales site matched to the preference category as the recommendation category based on the matching information.

Preferably, when receiving connection information of the specific user connecting the specific product sales site from an affiliated store server corresponding to the specific product sales site, the recommender may select one or more interest products, which the specific user prefers, from one or more products that are sold on another product sales site by performing analysis in accordance with a preset recommendation algorithm based on one or more items of behavior log information corresponding to the specific user and the another product sales site; determine one or more recommendation categories based on the one or more interest products in a manner of selecting a category to which the interest products pertain as the preference category from one or more categories set in the another product sales site and then determining a category of the specific product sales site matched to the reference category as a recommendation category based on the matching information; and create and then transmit recommendation result information comprising the one or more recommendation categories to the affiliated store server such that the affiliated store server selects and recommends a recommendation product to the specific user based on one or more recommendation categories according to the recommendation result information, or create and transmit product recommendation information including one or more recommendation products to the affiliated store server or a user terminal of the specific user based on the recommendation result information.

Preferably, service providing apparatus for cross-recommendation between product sales sites based on online may further comprise a storage unit configured to store product information received from each of the plurality of product sales sites, wherein the recommender checks whether a visit history of the specific user exists based on behavior log information corresponding to the specific user for each of the specific product sales site and another product sales site when receiving the connection information, and when there is a visit history of the specific user on both of the specific product sales site and the another product sales site, the recommender selects a recommendation product for one or more items of product information corresponding to the specific product sales site stored in the storage unit using behavior log information corresponding to the specific product sales site and the specific user, selects a recommendation products in accordance with a preset recommendation product selection reference for each of one or more recommendation categories according to the recommendation result information for one or more items of product information corresponding to the specific product sales site, and creates the product recommendation information including the one or more selected recommendation products; and when there is a visit history on only the another product sales site, the recommender creates product recommendation information comprising only a recommendation product selected in accordance with the recommendation result information for one or more items of product information corresponding to the specific product sales site.

Furthermore, the present invention provides a service providing a method for cross-recommendation between product sales sites based on online, the service providing method comprising: collecting behavior log information according to use of a product sales site of a plurality of users for each of a plurality of different product sales sites that is a plurality of different web sites; grouping items of log information, in which a user corresponding to behavior log information and a category set in a product sales site corresponding to the behavior log are the same, into a log group, calculating a category point corresponding to a log group in accordance with a preset first algorithm for each of a plurality of log groups, and creating category identification information for identifying a user, a product sales site, and a category corresponding to a log group and category preference information comprising a category point for each of the plurality of log groups; calculating similarity between categories in accordance with a preset second algorithm based on a plurality of items of category preference information created for a plurality of user, and creating matching information in which categories of different product sales sites are matched to each other based on the similarity; and creating and providing recommendation result information comprising a category of a specific product sales site matched to a category of another product sales site that a specific user prefers according to the collected behavior information based on the matching information for a user terminal of the specific user connecting to the specific product sales site.

Furthermore, the present invention provides a non-transitory computer-readable storage medium in which a computer program for operating a computer to perform the method for cross-recommendation between product sales sites based on online is recorded.

Furthermore, the present invention provides a service providing system for cross-recommendation between product sales sites based on online, the service providing system comprising: a plurality of affiliated store servers configured to provide a product sales site that is a web site to a user terminal of a user, collect and transmit behavior log information according to use of the product sales site by the user, and provide different product sales sites; and a service providing apparatus configured to collect behavior log information according to use of a product sales site by a plurality of users for each of a plurality of different product sales site by communicating with the plurality of affiliated store servers, group items of log information, in which a user corresponding to behavior log information and a category set in a product sales site corresponding to the behavior log are the same, into a log group, calculate a category point corresponding to a log group in accordance with a preset first algorithm for each of a plurality of log groups, create category identification information for identifying a user, a product sales site, and a category corresponding to a log group and category preference information comprising a category point for each of the plurality of log groups, calculate similarity between categories in accordance with a preset second algorithm based on a plurality of items of category preference information created for a plurality of user, create matching information in which categories of different product sales sites are matched to each other based on the similarity, and create and provide recommendation result information comprising a category of a specific product sales site matched to a category of another product sales site that a specific user prefers according to the collected behavior information based on the matching information for a user terminal of the specific user connecting to the specific product sales site.

The present disclosure can collect behavior log of a customer on each of a plurality of different product sales sites; can calculate a point for each of product categories to which products that the customer prefers pertains on the basis of the behavior log for each product sales site; can calculate similarity between product categories of different product sales sites on the basis of a point calculated for each product category for each of a plurality of product sales sites for each customer; can calculate a matching result of matching product categories with highest similarity; can create a matching result of matching categories between different product sales sites by checking category that customers, who are interested in specific category of a specific product sales site, are the most interested in on different product sales sites; can determine a product category having highest similarity with a product category, to which a product that a specific customer were the most interested in on another product sales site pertains, of product categories pertaining to a specific product sales site that the customer has visited, on the basis of a matching result to which opinions of various customers were reflected; and can give support so that cross-recommendation is made between different product sales sites on the basis of the determined product category. Accordingly, there is an effect that not only it is possible to give support such that various and accurate products are recommended to a customer because products are recommended even using a behavior history of the customer on another product sales site, but it is possible to greatly increase satisfaction of a customer on product recommendation by supporting product recommendation to which opinions of various customers were reflected is supported even in cross-recommendation between different product sales sites.

Further, even though there is no history of using a specific product sales site by a customer who visited the specific product sales site, the present disclosure can determine a category on another product sales site that the customer prefers on the basis of a history of using of the customer on the another product sales site, select a category of the specific product sales site having highest similarity with the determined category as a recommendation category, and recommend a product pertaining to the recommendation category as a recommendation product, so it is possible to increase accuracy in product recommendation of a specific product sales site on which it is difficult to recommend a product because there is not history of using of the customer. Accordingly, it is possible to increase also satisfaction of a selling company that runs the specific product sales site.

BRIEF DESCRIPTION OF THE DRAWINGS

The above and other objectives, features and other advantages of the present disclosure will be more clearly understood from the following detailed description when taken in conjunction with the accompanying drawings, in which:

FIGS. 3 to 5 are exemplary diagrams showing a category matching process in a service providing method for cross-recommendation between product sales sites based on online of the service providing apparatus according to an embodiment of the present disclosure.

DETAILED DESCRIPTION

Hereinafter, detailed embodiments of the present disclosure are described with reference to the drawings.

Figure 1:
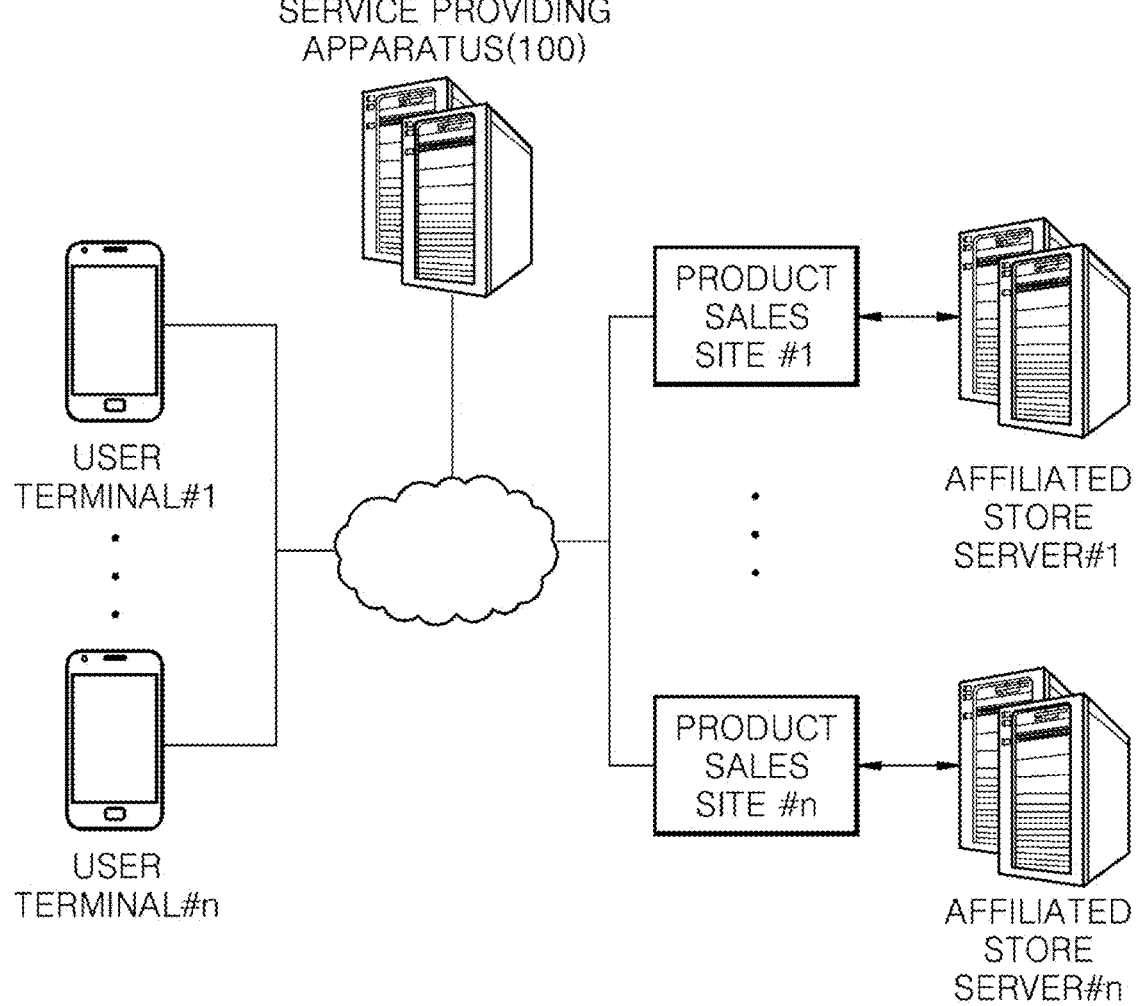
FIG. 1 is a configuration diagram of a service providing system for cross-recommendation between product sales sites based on online according to an embodiment of the present disclosure.

FIG. 1 is a configuration diagram of a service providing system for cross-recommendation between product sales sites based on online according to an embodiment of the present disclosure.

As shown in the figure, a service providing system for cross-recommendation between product sales sites based on online according to an embodiment of the present disclosure may include: one or more user terminals, a plurality of affiliated store servers (or an affiliated company server or a member company serer or a selling company server) that is web sites for selling products to the user terminal and each provides a product sales site, and a service providing apparatus 100 that communicates with the one or more user terminals and the plurality of affiliated store servers through a communication network.

Further, a service providing system for cross-recommendation between product sales sites based on online may be configured by components more than the components shown in FIG. 1, and a service providing system for cross-recommendation between product sales sites based on online may be configured also by less components.

Further, the communication network described in the present disclosure may include wired/wireless communication networks, and the wireless communication network may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Further, the user terminal may be various terminals such as a smart phone, a portable terminal, a mobile terminal a Personal Digital Assistant (PDA), a personal computer, a notebook computer, a slate PC, a tablet PC, and an ultrabook.

Further, the affiliated store server may perform sign-up on the user of the user terminal by communicating with the user terminal through the communication network and can store sign-up information of the user in a DB configured in the affiliated store server.

Further, the affiliated store server can store product information of the sales products in the DB and can transmit the product information stored in the DB to the service providing apparatus 100.

Further, the affiliated store server runs product sales sites different from each other and can provide different product sales sites to the user terminal.

In this case, the product sales site described in the present disclosure may be an online product sales site (online-based product sales site) and, for example, may be a web site related to an online shopping mall.

For example, a first affiliated store server of the plurality of affiliated store servers can provide a first product sales site to the user terminal and a second affiliated store server of the plurality of affiliated store servers can provide a second product sales site different from the first product sales site to the user terminal.

Further, the first product sales site may include one or more web pages, and may include a homepage, one or more homepages (product-related web pages) respectively corresponding to one or more products, etc.

Further, the service providing apparatus 100 may be a service server.

In this case, the service providing apparatus 100 or the affiliated store server may include one or more of a web server, a web application server, a database server, a proxy server, etc., and may be implemented in types of a web server, a web application server, a database server, a proxy server, etc. Further, a network load distribution mechanism and one or more of various items of software that enables the service server to operate on the internet or other networks may be installed in the service providing apparatus 100 or the affiliated store server, whereby the service providing apparatus 100 or the affiliated store server may be implemented as a computerized system. Further, a network may be an http network and may be a private line, an intranet, or other certain networks. Further, the service providing apparatus 100, the affiliated store server, and the user terminal may be connected through a security network so that data is not attacked by certain hackers or other third persons. Further, the service providing apparatus 100 or the affiliated store server may include one or more database servers and the database servers may be separately connected with the service providing apparatus 100 or the affiliated store server through certain type of network connection including a distribution database server architecture.

Further, the service providing apparatus 100 can receive product information of a sales product from the affiliated store server and can store the product information in the product DB configured in the service providing apparatus 100.

In this case, the product information may include various items of information such as meta information (metal tag information or metadata) constituting a product page that is a product-related web page included in the product sales site, product-related attribute information, product-related detailed information, a category to which a product pertains, and a product-related image.

Further, the service providing apparatus 100 can collect site information including category setting information of one or more categories (or one or more categories set on a product sales site) provided by the product sales site on the product sales site provided by the affiliated store server and site identification information, and can match and store product information received from an affiliated store server corresponding to the site information with the site information.

In this case, the category described in the present disclosure may be a product category for sorting (discriminating) products by kind and the product category may be a large category that is the first classification stage (or the largest classification unit). Hereafter, the product category is referred to as a category for the convenience of description.

Further, a category included in site information corresponding to a specific product sales site (or a product sales site) may be set as an unique identification code discriminated from a category (categories) of other product sales sites.

Further, the service providing apparatus 100 may connect to the product sales site and obtain site information from the product sales site or receive the site information from the affiliated store server.

Further, site identification information included in the site information may include address information (e.g., a uniform resource locator (URL) address) of the product sales site, server identification information corresponding to the affiliated store server, or the like.

Accordingly, the service providing apparatus 100 can match and store one or more items of product information corresponding to site information with the site information in the product DB for each of a plurality of items of site information while storing a plurality of items of site information corresponding to a plurality of different affiliated store servers (a plurality of different product sales sites), respectively, in the product DB.

Further, the service providing apparatus 100 can receive sign-up information created in accordance with sign-up to the affiliated store server of the user (or a product sales site corresponding to an affiliated store server) from the plurality of affiliated store servers and can store the sign-up information in a member DB configured in the service providing apparatus 100.

In this case, a service company running the service providing apparatus 100 may be configured in an affiliation relationship with a selling company running the affiliated store server, and the affiliated store server can inquire the user of the user terminal of whether the member information of the user is shared with the service providing apparatus 100 in sign-up and can transmit the sign-up information to the service providing apparatus 100 when sharing of the member information of the user is allowed.

Accordingly, the service providing apparatus 100 can create member information corresponding to a user on the basis of sing-up information (or combined member information) provided from each of the plurality of affiliated store servers, and the member information may include a plurality of items of sing-up information respectively corresponding to the plurality of affiliated store servers.

Alternatively, the service providing apparatus 100 may be configured to provide a web service to the user terminal, and can perform inquiring for whether the member information is allowed to be shared to the user terminal to share member information created in accordance with sing-up with the plurality of affiliated store servers in sign-up for using a web service by communicating with the user terminal and transmits the member information to the plurality of affiliated store servers such that the same member information corresponding to the user is stored in each of the plurality of affiliated store servers.

In this case, the user terminal can log in using the member information registered in sign-up for the service providing apparatus 100 when it logs in any one of the plurality of affiliated store servers.

Further, the affiliated store server can select and recommend one or more recommendation products from sales products through a product sales site thereof for a user terminal connecting to the product sales site in accordance with a preset recommendation algorithm.

Further, when a user of a user terminal generates events such as product searching, adding, putting in a cart, and buying when using the product sale site, the affiliated store server can create log information including a preset event type corresponding to a corresponding event, and can match and store corresponding behavior log information with the member information of the user in a DB.

According to the configuration, the service providing apparatus 100 according to an embodiment of the present disclosure support cross-recommendation between product sales sites: by collecting behavior log information according to use of product sale sites of a user from each of a plurality of affiliated store servers by communicating with the plurality of affiliated store servers providing different product sales sites; by calculating a preference point for each of one or more categories set in the product sales sites on the basis of the collected behavior log information in correspondence to the product sales sites in each product sales site; by creating matching information obtained by measuring similarity between a plurality of categories set in the different product sales sites on the basis of the preference points and matching categories with high similarity to each other; and by recommending a product corresponding to a category of a specific product sales site matched with a preferred category in another product sales site to a user terminal connecting the specific product sales site on the basis of the matching information, whereby it is possible to give support such that various product groups with high accuracy are recommended by reflecting not only use information of a user in a specific product sales site, but use information in another product sales site to product group recommendation in the specific product sales site.

Figure 2:
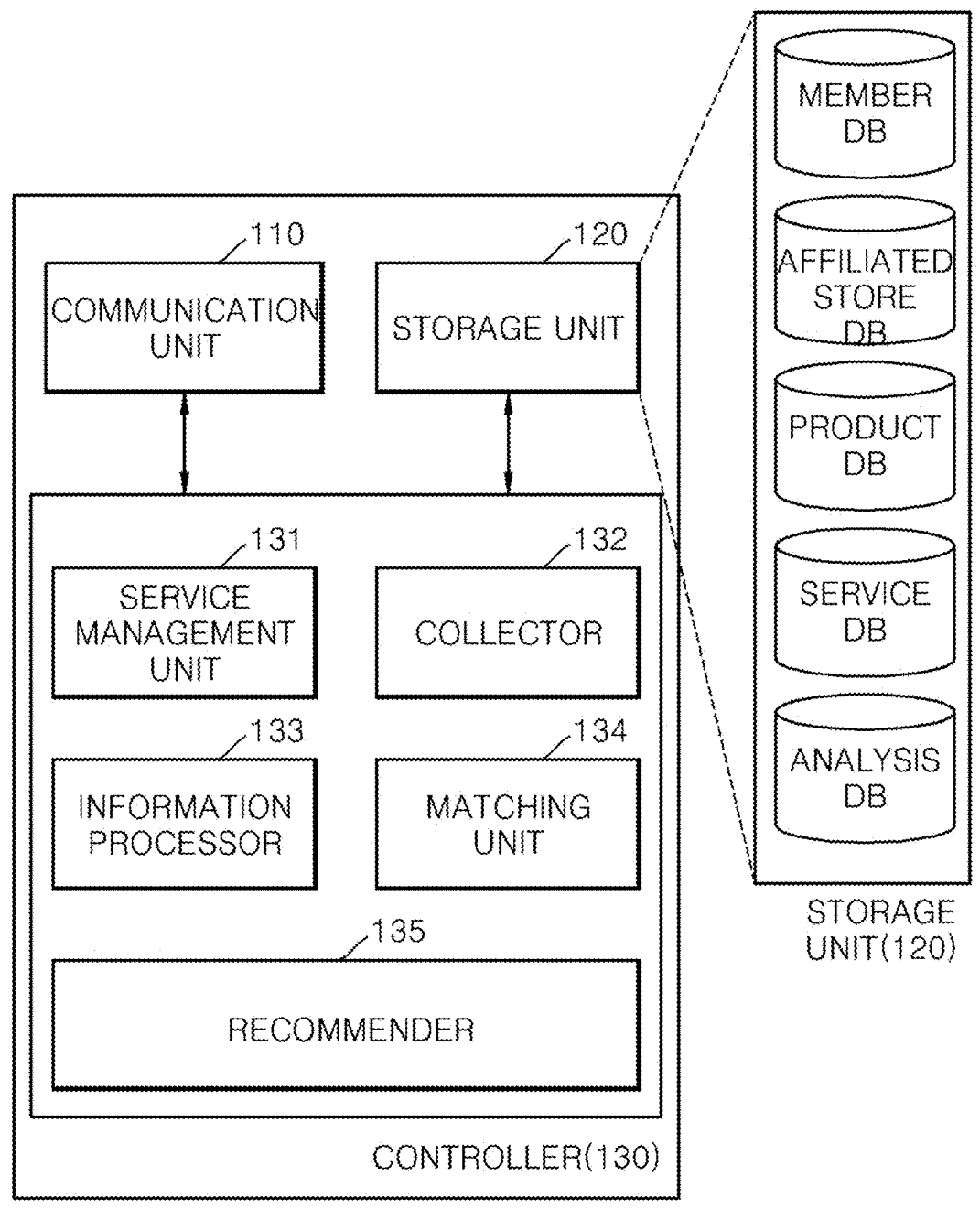
FIG. 2 is a configuration diagram of a service providing apparatus for cross-recommendation between product sales sites based on online according to an embodiment of the present disclosure.
Figure 3:
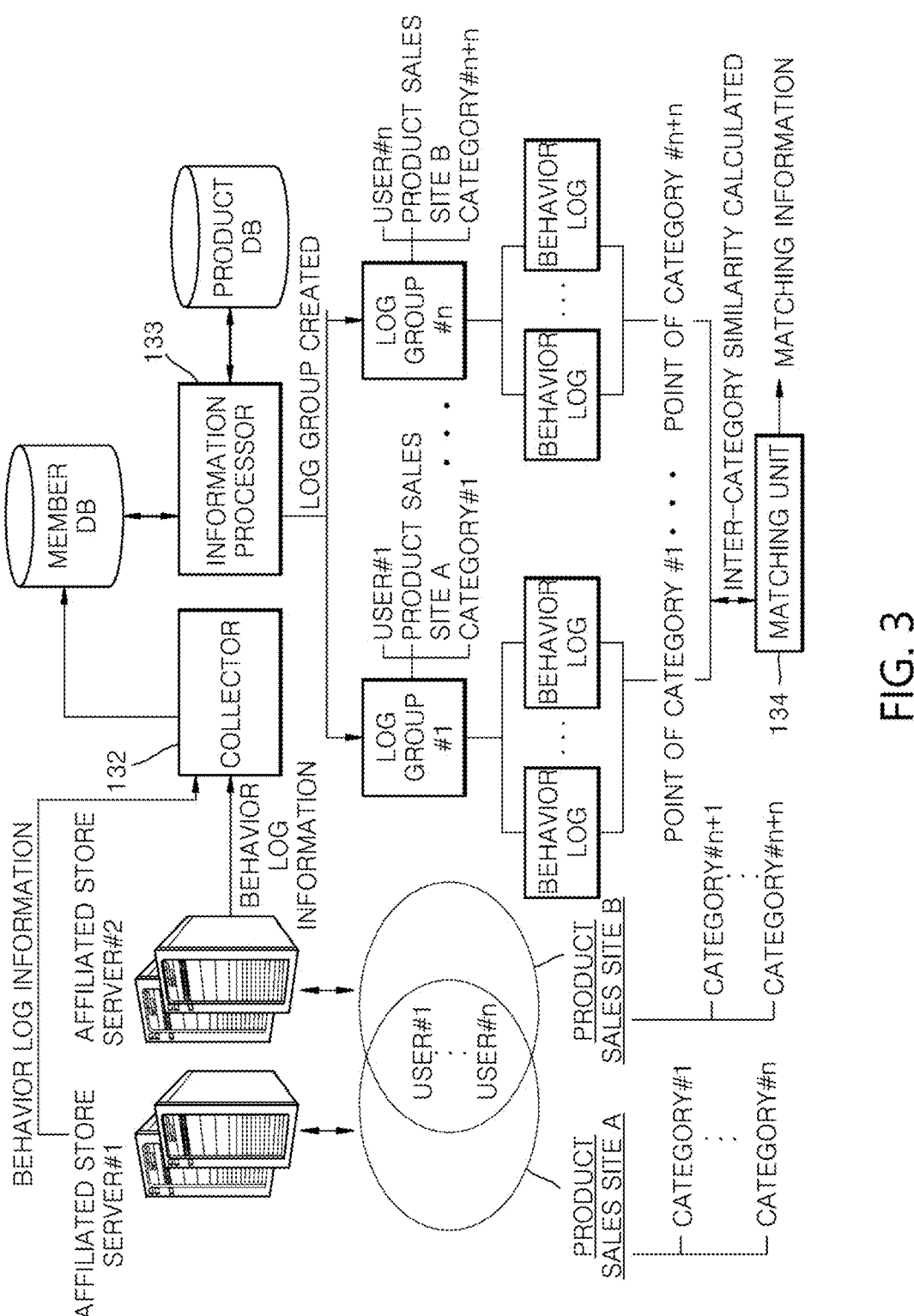

FIG. 2 is a configuration diagram of the service providing apparatus 100 for cross-recommendation between product sales sites based on online according to an embodiment of the present disclosure and FIG. 3 is an exemplary diagram showing a category matching process in a service providing method for cross-recommendation between product sales sites based on online of the service providing apparatus 100 according to an embodiment of the present disclosure.

As shown in the figure, a service providing apparatus 100 according to an embodiment of the present disclosure may include a communication unit 110, a storage unit 120, and a controller 130.

First, the communication unit 110 can communicate with one or more user terminals and a plurality of affiliated store servers through the communication network.

Further, the storage unit 120 can store various items of information. The storage unit 120 may be configured in various types such as a Hard Disk Drive (HDD) and a Solid State Drive (SSD) and may be a DB or may include one or more DBs.

For example, the storage unit 120 may include a product DB in which product information received from the affiliated store server is stored, a member DB in which member information of each of one or more users respectively corresponding one or more user terminals is stored, an analysis DB in which category preference information to be described below is stored, etc.

In this case, the storage unit 120 may further include a service DB in which web site-related data corresponding to a web service provided to the user terminal by the service providing apparatus 100 is stored, an affiliated store DB in which affiliated store information of each of a plurality of affiliated stores respectively corresponding to the plurality of affiliated store servers is stored, etc.

Further, the service DB, the product DB, the affiliated store DB, and the member DB, etc. may be individual servers and may be configured to be linked by communicating with the service providing apparatus 100.

Further, the controller 130 may perform a general control function of the service providing apparatus 100 and may include a RAM, a ROM, a CPU, a GPU, and buses, and the RAM, the ROM, the CPU, the GPU, etc. may be connected through the buses.

Further, the communication unit 110 and the storage unit 120 may be included in the controller 130.

Further, the controller 130 can perform a general control function of the service providing apparatus 100 and may include a service management unit 131, a collector 132, an information processor 133, a matching unit 134, a recommender 135, etc.

In this case, the controller 130 and at least one of various components constituting the controller 130 can communicate with the user terminal, the affiliated store server, etc. through the communication unit 110, and a communication configuration through the communication unit 110 is omitted hereafter.

A plurality of components constituting the controller 130 may be implemented by a processor that can process data, etc., and may be separately implemented by different processors or may be functionally separated in one processor.

First, the service management unit 131 can receive sign-up information of a user registered on affiliated store servers from each of the plurality of affiliated store servers, identify a plurality of items of sign-up information corresponding to a user in the sign-up information received from each of the plurality of affiliated store servers, combine the plurality of items of identified sign-up information into one item of member information (or combined member information), and store the one item of member information in a member DB included in the storage unit 120.

That is, the member information may include the plurality of items of identified sign-up information corresponding to a user. The member information may include various items of information such as the name, sex, and address of a user, terminal identification information of a user terminal corresponding to a user such as a phone number, and a user's ID used for sign-up.

In this case, the terminal identification information may include a Mobile Directory Number (MDM), a mobile IP, mobile media access control (MAC), a MAC address, a subscriber identity module (SIM) card unique information, a serial number, etc., and the terminal identification information and the member ID of a user may be used as user identification information described in the present disclosure.

Further, the service management unit 131 can identify a plurality of items of sign-up information corresponding to a user on the basis of the terminal identification information.

Further, the service management unit 131 may be configured to provide a web service to the user terminal on the basis of web service-related data stored in the service DB included in the storage unit 120, and can store member information created by performing sign-up for using a web service through communication with the user terminal in a member DB.

Further, the service management unit 131 can perform inquiring for whether to allow sharing of the member information to the user terminal in order to share the member information created in accordance with sign-up with the plurality of affiliated store servers in the process of sign-up and can transmit the member information to the plurality of affiliated store servers when there is response to sharing from the user terminal so that the same member information corresponding to the user is stored in each of the plurality of affiliated store servers.

Accordingly, the user terminal can log in using the member information registered in sign-up for the service providing apparatus 100 when it logs in any one of the plurality of affiliated store servers.

Meanwhile, the collector 132 can collect behavior log information according to use of product sales sites of a user for each of a plurality of different product sales sites that is a plurality of different web sites.

In this case, when the user of a user terminal generates preset events such as search, adding, putting in a cart, buying, etc. for a product when using the product sales site, the behavior log information may include a preset event type corresponding to a corresponding event, product identification information of a product having the event generated, etc., and may be information that is created by an affiliated store server providing the product sales site and is provided to the service providing apparatus 100 from the affiliated store server.

Further, the behavior log information may be stored in a DB configured in the affiliated store server and may include even type information of the one or more even types, user identification information, product identification information, etc.

Further, the collector 132 can receive behavior log information from each of a plurality of affiliated store servers by transmitting log request information for periodically requesting behavior log information of each user to each of the plurality of affiliated store servers.

Alternatively, the affiliated store server can transmit behavior log information to the service providing server 100 every time behavior log information is created in accordance with use of a product sales site by the user terminal connecting the product sale site provided by the affiliated store server.

Further, the collector 132 can identify member information of a user corresponding to the behavior log information on the basis of user identification information included in the behavior log information from a member DB, and can match and store the behavior log information with the member information of the user in the member DB.

Accordingly, the collector 132 can store member information of each of a plurality of different users in the member DB in linkage with the service management unit 131, can receive behavior log information of each of the users by communicating with the plurality of affiliated store servers, and can match and store the behavior log information with member information in the member DB.

Further, the collector 132 can receive and collect site information including category setting information of one or more categories set in a product sales site and site identification information for identifying a corresponding product sales site for each of a plurality of product sale sites from an affiliated store server corresponding to the product sales site, and can store the site information in the product DB included in the storage unit 120.

In this case, the category included in the category setting information corresponding to a specific product sales site (or a product sales site) may be the name of the category or may be set (configured) as a unique identification code (or a unique category identification code) for discriminating (distinguishing) from a category of another product sales site.

For example, a category included in the category setting information may be configured as the name of the category set in a product sales site or a unique identification code for discriminating the category and the product sale site in which the category is set, and the affiliated store server may provide the unique identification code corresponding to the category with the site information as the category or the collector 132 may give a unique identification code to a category corresponding to the product sales site and manage the unique identification information with the category setting information as a category corresponding to the product sales site.

Further, the category described in the present disclosure may be category information (category data) and the category information may include the name of the category, a unique identification code corresponding to the category, etc.

Further, the collector 132 may share a unique identification code corresponding to a category with an affiliated store server by providing the category setting information to the affiliated store server.

Further, the collector 132 can receive one or more items of product information respectively corresponding to one or more products that are sold at a product sales site from an affiliated store server corresponding to site information of the product sales site and match and store the received one or more items of product information with the site information in the product DB, and can receive product information from each of a plurality of affiliated store servers and store the product information in the product DB, as described above.

In this case, the category may be a large category corresponding to the first classification stage (or the largest classification unit or the highest classification stage).

Further, the collector 132 may connect to the product sales site and obtain site information from the product sales site or receive the site information from the affiliated store server.

Accordingly, the collector 132 can match and store one or more items of product information corresponding to site information with the site information in the product DB for each of a plurality of items of site information while storing a plurality of items of site information corresponding to a plurality of different affiliated store servers (a plurality of different product sales sites), respectively, in the product DB.

Further, the information processor 133 can calculate a category point corresponding to a log group in accordance with a preset first algorithm for each of a plurality of log groups created by grouping items of log information, in which a user corresponding to behavior log information and a category of a product sales site corresponding to the behavior log are the same, into a log group, can create category identification information (or category determination information) for identifying a user, a product sales site, and a category corresponding to a log group and category preference information including a category point for each of the plurality of log groups.

For example, the information processor 133 can identify one or more items of behavior information in which site identification information corresponding to site information of a first product sales site stored in a product DB are set for the first product sales site of a plurality of product sales sites and that are matched with the member information of a specific user, from the member DB.

Further, the information processor 133 can identify and extract product information, which corresponds to behavior log information, from the product DB on the basis of product identification information included in behavior log information for each of one or more items of behavior log information identified from the member DB and can identify a category to which a product pertains to in the product information, and can identify the identified category as a category corresponding to the behavior log information.

In this case, the category identified by the information processor 133 in the product information identified on the basis of product identification information included in log information corresponding to the first product sales site and a specific user may be any one of one or more categories according to category setting information included in the site information of the first product sales site.

Further, the information processor 133 can create one or more log groups (or log group information) by grouping items of behavior log information corresponding to same categories on the basis of categories identified for behavior log information for the identified one or more items of behavior log information.

In this case, the information processor 133 can put category identification information in each of one or more log groups created to correspond to the first product sales site and a specific user in a manner of creating user identification information of the specific user corresponding to one or more items of behavior log information pertaining to a specific log group, site identification information of a product sales site corresponding to the one or more items of behavior log information pertaining to the specific log group, and category identification information (or category determination information) including a category corresponding to the one or more items of behavior log information pertaining to the specific log group and then of putting the items of information into the specific log group (or specific log group information).

Accordingly, the information processor 133 can selectively create a log group including category identification information (or category determination information) and one or more items of behavior log information corresponding to a specific user for each of one or more categories corresponding to the first product sales site.

In this case, when there is no behavior log information corresponding to a specific category set in a specific product sales site, the information processor 133 may not create a log group for the specific category.

Further, the information processor 133 can calculate a category point (or a category interest point by applying an event type (event type information), which is included in each of one or more items of behavior log information pertaining to a log group corresponding to a category for each of one or more categories corresponding to the first product sales site, to a first algorithm set in advance for one or more log groups created to correspond to a specific user and the first product sales site.

In this case, the first algorithm may be a widely-known collaborative filtering algorithm that calculates a point by analyzing behavior log information such as a use pattern, a consumption record, etc. of a user and giving a weight.

For example, the information processor 133 can calculate a category point corresponding to the specific user for each of one or more categories corresponding to the first product sales site by calculating a category point corresponding to a specific category, in a manner of determining the event type of an event generated by the specific user in each of one or more items of behavior log information included in a log group, in which behavior log information is grouped to correspond to the specific user and a specific category set in the first product sales site, of giving a weight corresponding to an event type for each of the event types by applying the determined one or more event types respectively corresponding to the one or more items of behavior log information to the first algorithm, and then of calculating a category point corresponding to the specific category by performing calculation through the first algorithm on the basis of the weight given to each of the one or more event types.

In this case, the information processor 133 can calculate a category point by applying one or more items of behavior information included in log information corresponding to a specific category to various point calculation manners set in the first algorithm such as a manner of giving a weight (or a point) of 1 to a first even type for product searching, giving a weight of 2 to a second even type for adding of a product, giving a weight of 3 to a third event type for putting a product in a cart, and giving a weigh of 4 to a fourth event type for buying of a product.

For example, the information processor 133 can calculate a category point of 3 for an item 'shoes', which is a category set in the first product sales site, on the basis of one or more items of behavior log information of a specific user corresponding to the first product sales site and calculate a category point of 5 for an item 'T-shirt', which is another category set in the first product sales site, on the basis of one or more items of behavior log information of the specific user corresponding to the first product sales site. Accordingly, it can be determined that the specific user has more interest (higher preference) in a category related to 'T-shirt' than a category related to 'shoes' in the first product sales site.

Accordingly, the information processor 133 can calculate a category information for each of one or more categories respectively corresponding one or more log groups corresponding to the first product sales site and the specific user, and can create category preference information by extracting the category identification information (or category determination information) from a log group corresponding to the category point for each of category points calculated for each of the categories and then by matching the category preference information with the category points.

In this case, the category preference information may include the category identification information, category point, etc.

Further, the information processor 133 can process a category process as 0 or null for a category, in which a log group related to a specific user does not exist (a log group is not created), of one or more categories corresponding to the first product sales site and can create category preference information including user identification information of the specific user, site identification information of a product sales site corresponding to a corresponding category, category identification information of the category, and the category point set as 0 or null.

That is, the information processor 133 can create category preference information respectively corresponding to one or more categories set in the first product sales sites to correspond to the specific user.

Further, the information processor 133 can calculate a category pint corresponding to a specific user through the same processing process as the above description also for each of one or more categories set in a second product sales site different from the first product sales site.

For example, the information processor 133 can identify one or more items of behavior information in which site identification information corresponding to site information of a second product sales site stored in a product DB are set for the second product sales site of a plurality of product sales sites and that are matched with the member information of a specific user, from the member DB.

Further, the information processor 133 can identify and extract product information, which corresponds to behavior log information, from the product DB on the basis of product identification information included in behavior log information for each of one or more items of behavior log information corresponding to the second product sales site and the specific user and identified from the member DB and can identify a category to which a product pertains to in the product information, and can identify the identified category as a category corresponding to the behavior log information.

In this case, the category identified by the information processor 133 in the product information identified on the basis of product identification information included in log information corresponding to the second product sales site and a specific user may be any one of one or more categories according to category setting information included in the site information of the second product sales site.

Further, the information processor 133 can create one or more log groups (or log group information) by grouping items of behavior log information corresponding to same categories on the basis of categories identified for behavior log information for the identified one or more items of behavior log information corresponding to the second product sales site and the specific user.

In this case, the information processor 133 can put category identification information in each of one or more log groups created to correspond to the second product sales site in a manner of creating user identification information of the specific user corresponding to one or more items of behavior log information pertaining to a specific log group, site identification information of the second product sales site corresponding to the one or more items of behavior log information pertaining to the specific log group, and category identification information including a category corresponding to the one or more items of behavior log information pertaining to the specific log group and then of putting the items of information into the specific log group (or specific log group information).

Accordingly, the information processor 133 can selectively create a log group including category identification information and one or more items of behavior log information corresponding to a specific user for each of one or more categories corresponding to the second product sales site.

Further, the information processor 133 can calculate a category point (or a category interest point by applying an event type (event type information), which is included in each of one or more items of behavior log information pertaining to a log group corresponding to a category for each of one or more categories corresponding to the second product sales site, to a first algorithm set in advance for one or more log groups created to correspond to a specific user and the second product sales site.

For example, the information processor 133 can calculate a category point of 3 for an item 'leather shoes', which is a category set in the second product sales site, on the basis of one or more items of behavior log information of a specific user corresponding to the second product sales site and calculate a category point of 5 for an item 'Y-shirt', which is another category set in the second product sales site, on the basis of one or more items of behavior log information of the specific user corresponding to the second product sales site. Accordingly, it is possible to determine that the specific user has more interest (higher preference) in a category related to 'Y-shirt' than a category related to 'leather shoes' in the second product sales site.

Accordingly, the information processor 133 can calculate a category information for each of one or more categories respectively corresponding one or more log groups corresponding to the second product sales site and the specific user, and can create category preference information by extracting the category identification information from a log group corresponding to the category point for each of category points calculated for each of the categories and then by matching the category preference information with the category points.

Further, the information processor 133 can process a category process as 0 or null for a category, in which a log group related to a specific user does not exist (a log group is not created), of one or more categories corresponding to the second product sales site and can create category preference information including user identification information of the specific user, site identification information of a product sales site corresponding to a corresponding category, category identification information of the category, and the category point set as 0 or null.

That is, the information processor 133 can create category preference information respectively corresponding to one or more categories set in the second product sales sites to correspond to the specific user.

As described above, the information processor 133 can create one or more items of category preference information, which includes a category point based on behavior log information of a specific user for each of categories set in a product sales site and which can identify a specific user, a product sales site, and a category that correspond to the category point, for each of a plurality of different product sales sites.

Further, as shown in FIG. 4, the information processor 133 can create one or more items of category preference information for other one or more users for a plurality of product sales sites in the same manner as the manner of creating one or more items of category preference information for the specific user for a plurality of product sales sites, as described above.

That is, the information processor 133 can calculate (create) category preference information for each of a plurality of product sales sites for each of a plurality of different users in the same manner as the manner of calculating category preference information for each of a plurality of product sales sites for a specific user.

For example, the information processor 133 can calculate category points of 3 and 2 respectively for a first category A_cat_1 and a second category A_cat_2 set in a first product sales site (site A) and can calculate category points of 0 and 3.5 respectively for a third category B_cat_1 and a fourth category B_cat_2 corresponding to a second product sales site (site B) in relation to a first user Usr_1 having a history of using the first product sales site and the second product sales site.

In this case, when there is no behavior log information of the first user that corresponds to the third category, the category point corresponding to the third category can be processed as 0 or null.

Further, the information processor 133 can create a plurality of items of category preference information respectively corresponding to the first category, the second category, the third category, and the fourth category for the first user.

Further, the information processor 133 can calculate category points of 4 and 1.5 respectively for a first category A_cat_1 and a second category A_cat_2 set in the first product sales site (site A) and can calculate category points of 0 or null for each of a third category B_cat_1 and a fourth category B_cat_2 corresponding to a second product sales site (site B) in relation to a second user Usr_2 having a history of using only the first product sales site.

Further, the information processor 133 can create a plurality of items of category preference information respectively corresponding to the first category, the second category, the third category, and the fourth category for the second user.

In this case, the information processor 133 can discriminate (distinguish) a plurality of categories set in different product sales sites as different categories on the basis of category identification information included in the category preference information even though the names of the categories are same.

Further, the information processor 133 can store a plurality of items of category preference information created for a plurality of users in the analysis DB included in the storage unit 120 of the service providing apparatus 100.

Meanwhile, the matching unit 134 can calculate inter-category similarity in accordance with a preset second algorithm on the basis of a plurality of items of category preference information created for a plurality of users that is stored in the analysis DB in linkage with the information processor 133, and can create matching information of matching categories of different product sales sites on the basis of the similarity.

Figure 5:
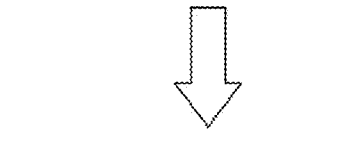

For example, as shown in FIG. 5, the matching unit creates matrix information of a matrix in which a plurality of user-specific category points are matched for a plurality of categories by matching the user-specific category points corresponding to categories for each of a plurality of categories respectively corresponding to a plurality of items of category preference information on the basis of the plurality of items of category preference information stored in the analysis DB, and applies the matrix information to a cosine distance (cosine distance function) that is a preset second algorithm, thereby being able to calculate similarity between different categories.

In this case, a plurality of categories respectively corresponding to the plurality of items of category preference information may include all of categories set in each of the plurality of product sales sites.

Further, the matching unit 134 can calculate the distance (distance value) between the first category and the second category by applying user-specific category points corresponding to the first category and user-specific category points corresponding to the second category to the second algorithm on the basis of the plurality of items of category preference information, and can set the distance as similarity.

In this case, a method such as a widely-know cosine distance may be used for the second algorithm, but the second algorithm is not limited thereto and various algorithms for calculating similarity may be applied to the second algorithm.

Further, the matching unit 134 can create matching information in which different categories are matched, by matching one or more different categories having highest similarity for the plurality of categories in a manner of matching a specific category set in a specific product sales site and another category having highest similarity on the basis of the similarity in accordance with a preset matching condition.

In this case, when a the category having highest similarity with a specific category in accordance with the matching condition is a category set in a product sales site the same as the specific category, the matching unit 134 can match other one or more categories having highest similarity in one or more categories in other product sales sites different from a specific product sales site corresponding to the specific category with the specific category without matching the another category with the specific category.

For example, as shown in FIG. 5, in the case of a first category A_cat_1 of a first product sales site (site A), a second category A_cat_2 of the first product sales site has highest similarity but the thing required for produce cross-recommendation is the similarity between categories pertaining to different product sales sites, so the matching unit 134 can select a fourth category B_cat_2 corresponding to a second product sales site (site B) having the next high similarity as a category that is a target to be matched with the first category A_cat_1.

Further, in the case of a third category B_cat_1 corresponding to the second product sales site, the similarity with the fourth category (B_cat_2) is the highest, but they are categories pertaining to the same product sales site, so the matching unit 134 does not match the third category and the fourth category to each other and may exclude the third category from matching information until a category of another product sales site that has highest similarity with the third category is found out by later update of the matching information when there is no category of a product sales site different from the second product sales site that has next highest similarity with the third category.

Further, since a second category A_cat_2 corresponding to the first product sales site has highest similarity with a fourth category B_cat_2 of the second product sales site different from the first product sales site and satisfies a matching condition, the matching unit 134 can match the second category A_cat_2 and the fourth category B_cat_2 to each other.

According to the configuration described above, the matching unit 134 can create matching information in which categories having highest similarity in different product sales sites are matched to each other by matching categories having highest similarity in different product sales sites for all of categories set in each of a plurality of product sales sites.

Figure 6:
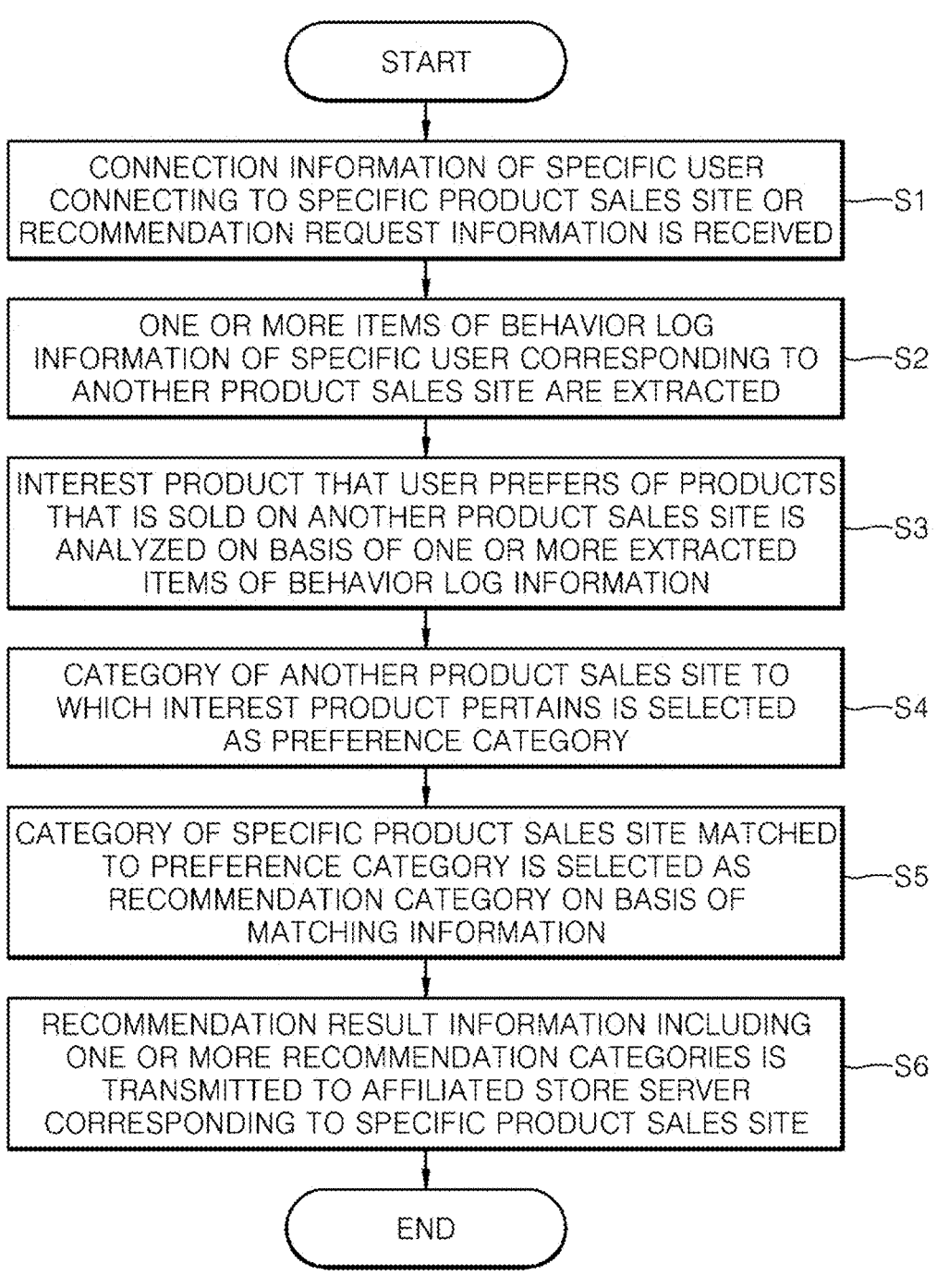
FIGS. 6 and 7 are operation flowcharts of a product cross-recommendation process between different product sales sites in the service providing method for cross-recommendation between product sales sites based on online of the service providing apparatus according to an embodiment of the present disclosure.
Figure 7:
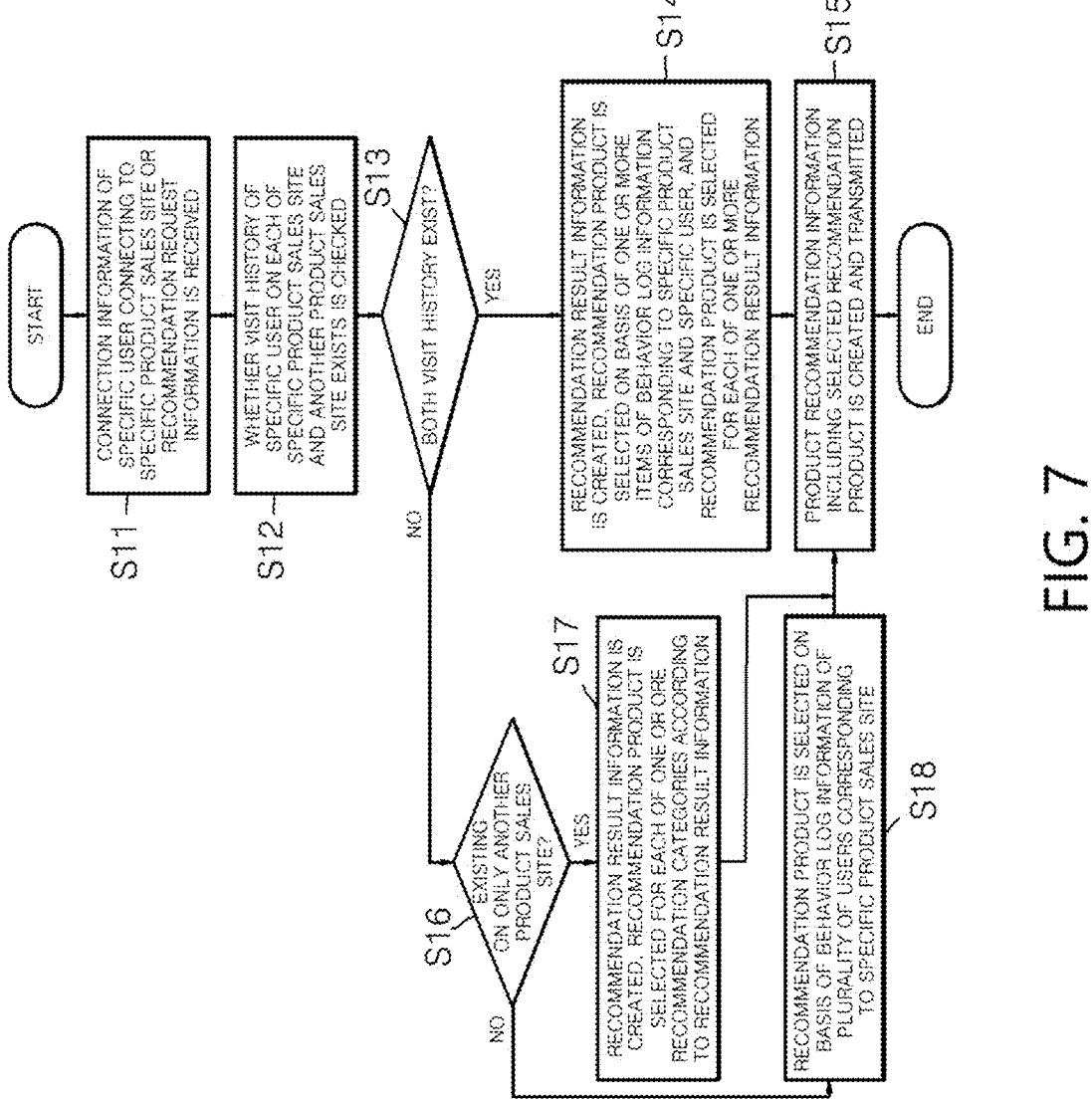

Meanwhile, FIGS. 6 and 7 is an operation flowchart of a product cross-recommendation process between different product sales sites in the service providing method for cross-recommendation between product sales sites based on online of the service providing apparatus 100 according to an embodiment of the present disclosure.

As shown in the figure, the recommender 135 can select a category of another product sales site that a specific user prefers as a preference category in accordance with a preset recommendation algorithm on the basis of one or more items of log information corresponding to the another product sales site and the specific user for a user terminal of the specific user connecting to a specific product sales site, can identify a category of the specific product sales site that is matched to the preference category on the basis of the matching information, create recommendation result information for recommending a product pertaining to the recommendation category, and transmit the recommendation result to an affiliated store server corresponding to the specific product sales site.

For example, the recommender 135 can receive connection information of a specific user connecting to the specific product sales site from the affiliated store server corresponding to the specific product sales site or can receive recommendation request information for recommending a product to the specific user (S1).

Further, when receiving connection information of a specific user connecting to the specific product sales site or receiving the recommendation request information from an affiliated store server corresponding to the specific product sales site, the recommender 135 can identify and extract one or more items of behavior information, which correspond to another product sales site different from the specific product sales site, in one or more items of behavior log information of the specific user from the member DB on the basis of user identification information included in the connection information or the recommendation request information (S2).

Further, the recommender 135 can select product information, which the specific user prefers, of one or more items of product information that is sold at the another product sales site (corresponds to the another product sales site) as an interest product from the product DB by performing analysis in accordance with a preset recommendation algorithm on the basis of the extracted one or more items of behavior log information corresponding to the specific user and the another product sales site (S3).

In this case, as the recommendation algorithm, various widely-known algorithms for analyzing a user's interest product or a recommendation product using behavior log information may be applied or various algorithms such as a product that is most popular in real time, a product of which the selling amount is highest in real time, a product that has the highest number of views, or the like. The recommender 135 may select recommendable product information to the specific user of one or more items of product information that is sold at the another product sales site from the product DB by performing analysis in accordance with a preset recommendation algorithm on the basis of the extracted one or more items of behavior log information corresponding to the specific user and the another product sales site and may set the recommendable product information as an interest product.

Further, the recommender 135 can identify a category to which the interest product pertains of one or more categories according to category setting information of the another product sales site on the basis of one or more items of product information selected as an interest product from the product DB and can select the identified category as a preference category of the specific user (S4).

In this case, the recommender 135 may select one or more preference categories on the basis of the one or more items of interest product-specific product information.

Further, the recommender 135 can determine one or more recommendation categories on the basis of the one or more preference categories in a manner of determining a category of the specific product sales site, which is matched to the preference category on the basis of the matching information, as the recommendation category (S5).

Further, the recommender 135 can create recommendation result information including the one or more recommendation categories and then transmit the recommendation result information to an recommendation result information corresponding to the specific product sales site (S6).

In this case, the recommendation result information may include user identification information of the specific user included in the connection information of the recommendation request information.

Accordingly, a specific affiliated store server corresponding to the specific product sales site can select and recommend a recommendation product to the specific user on the basis of one or more recommendation categories according to the recommendation result information.

In this case, the specific affiliated store server can create product recommendation information by determining a recommendation product from products pertaining to the recommendation category on the basis of one or more recommendation categories according to the recommendation result information and one or more items of behavior information corresponding to the specific user, and then transmit the product recommendation information to the user terminal.

In the configuration described above, the recommender 135 can create recommendation result information corresponding to the specific user, as described above, for each of one or more other product sales sites different from the specific product sales site, and can transmit one or more items of recommendation result information corresponding to each of the one or more other product sales sites to a specific affiliated store server corresponding to the specific product sales site.

For example, when a specific user connects to a product sales site A and a category 'leather shoes' set in a product sales site B is analyzed as a preference category of the specific user on the basis of behavior log information of the specific user corresponding to the product sales site B, the recommender 135 can determine a category 'business suit', which is a category of the product sales site A matched with the category 'leather shoes' on the basis of the matching condition, as a recommendation category and can transmit first recommendation result including the recommendation category to an affiliated store server of the product sales site A such that a suit-related product is recommended to the specific user through the product sales site A. Further, when a category 'casual' set on a product sales site C is analyzed as a preference category of a specific user on the basis of behavior log information of the specific user corresponding to the product sales site C, the recommender 135 can determine a category 'casual suit', which is a category of the product sales site A matched with the category 'casual' on the basis of the matching information, as a recommendation category and then can transmit second recommendation result information including the recommendation category to the affiliated store server of the product sales site A such that a casual suit-related product is recommended to the specific user through the product sales site A.

Further, the recommender 135 can directly determine a recommendation product in consideration of a visit history (behavior history) about a product sales site of a specific user who is a corresponding recommendation target user and can perform recommendation of a recommendation product on the user, which is described in detail with reference to FIG. 7.

First, when receiving the connection information of the recommendation request information (S11), the recommender 135 can check whether there is a visit history of the user on each of the specific product sales site and another product sales site (S12).

For example, the recommender 135 identifies member information of the specific user corresponding to the connection information of the recommendation request information from the member DB, identifies the one or more items of behavior log information corresponding to the identified member information from the member DB, and then can check whether there is a visit history on each of one or more product sales sites on the basis of the identified one or more items of behavior log information.

Accordingly, when there is a visit history of the specific user on both of the specific product sales site and the specific product sales site (S13), the recommender 135 can select a recommendation product in accordance with a preset recommendation product selection reference for one or more items of product information corresponding to the specific product sales site stored in the product DB (sold at the specific product sales site) on the basis of one or more items of behavior information corresponding to the specific product sales site and the specific user.

Further, the recommender 135, as shown in FIG. 6, can create the recommendation result information on the basis of behavior log information of the specific user corresponding to the specific product sales site and can select a recommendation product in accordance with a preset recommendation product selection reference for each of one or more recommendation categories according to the recommendation result information for one or more items of product information corresponding to the specific product sales site stored in the product DB (sold at the specific product sales site) (S14).

In this case, the recommender 135 can select a recommendation product in accordance with the recommendation product selection reference for one or more items of product information pertaining to a recommendation category of one or more items of product information corresponding to the specific product sales site when selecting a recommendation product according to the recommendation category.

Further, various widely-known recommendation algorithms for selecting a recommendation product based on behavior log information of a user may be applied to the recommendation product selection reference.

Alternatively, a recommendation algorithm that selects a product that is most popular in real time, a product of which the selling amount is highest in real time, a product that has the highest number of views, or the like as a recommendation product from products pertaining to the recommendation category may also be applied to the recommendation product selection reference.

Accordingly, the recommender 135 can create the product recommendation information including one or more recommendation products selected on the basis of behavior log information of the specific user corresponding to the specific product sales site and one or more recommendation products selected in accordance with recommendation result information created on the basis of behavior log information of the another product sales site (S15).

Further, when there is no visit history on the specific product sales site and there is a visit history on only another product sales site (S13 and S16), the recommender 135 can create product recommendation information including only a recommendation product selected in accordance with the recommendation result information for one or more items of product information corresponding to the specific product sales site (S17).

Further, the recommender 135 may transmit product recommendation information created as described above to a specific affiliated store server corresponding to a specific product sales site to which the user terminal of the specific user connects such that the specific affiliated store server provides the product recommendation information to the user terminal of the specific user through the specific product sales site, or may directly transmit the product recommendation information to the user terminal of the specific user (S15).

Further, when there is no visit history on both of the specific user on the specific product sales site and another product sales site or there is a visit history only on a specific product sales site that a specific user is visiting now (S16), the recommender 135 can create recommendation product information by determining a recommendation product in accordance with a preset recommendation product selection reference, in which various recommendation manners are set such as recommending a product that is the most viewed or purchased in real time, from products that are sold on the specific product sales site on the basis of behavior log information of a plurality of users corresponding to the specific product sales site, and then can provide the recommendation product information to the affiliated store server or the user terminal of the specific user (S18 and S15).

Meanwhile, in the configuration described above, the user terminal may be composed of a user terminal communication unit, a user terminal storage unit, a user terminal display, a user terminal voice output unit, and a user terminal controller. Not all of the components of the user terminal are necessary components, and the user terminal may be implemented by more components than the components of the user terminal and may be also implemented by less components.

The user terminal communication unit connects a wired/wireless communication network with a certain internal component or at least one certain external terminal for communication. In this case, the certain external terminal may include the service providing apparatus 100.

Further, the user terminal storage unit stores data, programs, etc. for operation of the use terminal.

Further, the user terminal display displays various items of information through the user terminal communication unit by control of the user terminal controller.

Further, the user terminal voice output unit outputs a guide voice created by control of the user terminal controller.

Further, the user terminal voice output unit can output voice information corresponding to information received through the communication unit by control of the user terminal controller.

The user terminal controller performs general control functions of the user terminal.

Further, the user terminal controller performs general control functions of the user terminal using the programs and data stored in the storage unit.

Further, the user terminal controller performs a sign-up procedure of a user (customer) of the user terminal in linkage with the service providing apparatus 100.

Further, the user terminal controller can transmit log information in correspondence to information received from the service providing apparatus 100 and the log information may include connection history-related information (e.g., cookies), identification information of the user terminal, etc.

Further, when the user of the user terminal controller is not a non-registered member of the service providing device, the user terminal controller performs a sign-up procedure of the user terminal (or the user of the user terminal) on the basis of guide information related to sign-up provided from the service providing apparatus 100.

Further, the user terminal may further include an input unit for receiving a signal according to button operation or selection of a certain function or for receiving an instruction or a control signal created by operation such as touching/scrolling a displayed image.

The service providing method according to an embodiment of the present disclosure described above can be constructed as a computer program, and codes and code segments constituting the computer program can be easily inferred by computer programmers in the field.

The computer program is stored in computer readable media and read out and executed by a computer or the affiliated store server, the service providing apparatus 100, and the user terminal according to an embodiment of the present disclosure, thereby being able to implement a service providing method.

The computer readable media include a magnetic recording medium and an optical recording medium. The computer program that implements the service providing method according to an embodiment of the present discloser may be stored and installed in an internal memory of the affiliated store server, the service providing apparatus 100, and the user terminal. Alternatively, an external memory such as a smart card in which the computer program that implements the service providing method according to an embodiment of the present discloser is stored and installed may be mounted in the affiliated store server, the service providing apparatus 100, and the user terminal through an interface.

The service providing method can be constructed as a computer program, and codes and code segments constituting the computer program can be easily inferred by computer programmers in the field. Further, the program related to the service providing method can be stored in information storage media that can be read by electronic devices (readable media) and can be read out and executed by electronic devices.

Various devices and components described herein may be achieved by a hardware circuit (e.g., a CMOS-based logic circuit), firmware, software, or a combination thereof. For example, they may be achieved by using transistors, logic gates, and electronic circuits in various electrical structures.

The components described in the embodiments of the present disclosure may be achieved by one or more common computers or computers for specific purposes, such as a storage; hardware such as a processor, a controller, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the range of right of the present disclosure.

DESCRIPTION OF REFERENCE NUMERALS

100: SERVICE PROVIDING APPARATUS
110: COMMUNICATION UNIT
120: STORAGE UNIT
130: CONTROLLER
131: SERVICE MANAGEMENT UNIT
132: COLLECTOR
133: INFORMATION PROCESSOR
134: MATCHING UNIT
135: RECOMMENDER

What is claimed is:

1. A service providing apparatus for cross-recommendation between online product sales sites, the service providing apparatus comprising:

one or more processors; and memory storing instructions thereon that, when executed by the one or more processors, cause the one or more processors to:

collect behavior log information of a plurality of users for each of a plurality of different product sales sites, each product sales site being a different web site;

group items of the behavior log information into log groups such that each log group comprises behavior log information corresponding to a common user and a common category of a product sales site;

calculate a category point for each log group by applying event types included in the behavior log information of the log group to a first algorithm that assigns a respective weight to each event type;

create, for each log group, category preference information comprising category identification information identifying the user, the product sales site, and the category corresponding to the log group, and the category point;

calculate similarity between categories of different product sales sites by applying a second algorithm to the category preference information created for a plurality of users;

create matching information in which categories of different product sales sites are matched to each other based on the similarity; and generate recommendation result information comprising a category of a first product sales site matched, based on the matching information, to a category of a second product sales site preferred by a specific user, and provide the recommendation result information to a user terminal of the specific user connecting to the first product sales site.

2. The service providing apparatus of claim 1, wherein the first algorithm is collaborative filtering.

3. The service providing apparatus of claim 1, wherein the behavior log information comprises information about at least one of product search, adding, putting in a cart, and buying by the user.

4. The service providing apparatus of claim 1, wherein the second algorithm is a cosine distance, and the instructions further cause the one or more processors to calculate a distance according to the cosine distance between a plurality of different categories based on the category preference information, use the calculated distance as the similarity, and create the matching information by matching, for each of the plurality of different categories, a category of a product sales site to one or more categories of another product sales site having the highest similarity.

5. The service providing apparatus of claim 1, wherein the instructions further cause the one or more processors to:

select a category of the second product sales site preferred by the specific user as a preference category based on one or more items of the behavior log information corresponding to the second product sales site and the specific user using a recommendation algorithm; and identify a category of the first product sales site matched to the preference category as a recommendation category based on the matching information, and generate the recommendation result information for recommending a product pertaining to the recommendation category.

6. The service providing apparatus of claim 5, wherein the instructions further cause the one or more processors to:

receive connection information of the specific user connecting to the first product sales site from an affiliated store server corresponding to the first product sales site;

select one or more interest products preferred by the specific user from products sold on the second product sales site based on the behavior log information corresponding to the specific user and the second product sales site using the recommendation algorithm;

determine one or more recommendation categories by selecting a category to which the one or more interest products pertain as the preference category from categories of the specific of the second product sales site and identifying a category of the first product sales site matched to the preference category as a recommendation category based on the matching information; and transmit the recommendation result information comprising the one or more recommendation categories to the affiliated store server for the affiliated store server to select and recommend a recommendation product to the specific user based on the one or more recommendation categories, or transmit product recommendation information comprising one or more recommendation products to the affiliated store server or the user terminal of the specific user.

7. The service providing apparatus of claim 6, further comprising a storage unit storing product information received from each of the plurality of product sales sites, wherein the instructions further cause the one or more processors to:

check whether a visit history of the specific user exists for each of the first product sales site and the second product sales site based on the behavior log information corresponding to the specific user upon receiving the connection information;

responsive to a visit history of the specific user existing on the first product sales site and the second product sales site, select a recommendation product from product information corresponding to the first product sales site stored in the storage unit based on the behavior log information corresponding to the first product sales site and the specific user, select a recommendation product for each of one or more recommendation categories according to the recommendation result information from the product information corresponding to the first product sales site, and create product recommendation information comprising the selected recommendation products; and responsive to a visit history of the specific user existing on the second product sales site and an absence of a visit history on the first product sales site, create product recommendation information comprising a recommendation product selected according to the recommendation result information from the product information corresponding to the first product sales site.

8. The service providing apparatus of claim 1, wherein the instructions further cause the one or more processors to create the matching information by, for each category of a product sales site, excluding categories of the same product sales site and matching the category to one or more categories of a different product sales site having the highest similarity.

9. A computer-implemented method for cross-recommendation between online product sales sites, the method comprising:

collecting behavior log information of a plurality of users for each of a plurality of different product sales sites, each product sales site being a different web site;

grouping items of the behavior log information into log groups such that each log group comprises behavior log information corresponding to a common user and a common category of a product sales site;

calculating a category point for each log group by applying event types included in the behavior log information of the log group to a first algorithm that assigns a respective weight to each event type;

creating, for each log group, category preference information comprising-category identification information identifying the user, the product sales site, and the category corresponding to the log group, and the category point;

calculating similarity between categories of different product sales sites by applying a second algorithm to the category preference information created for a plurality of users;

creating matching information in which categories of different product sales sites are matched to each other based on the similarity; and generating recommendation result information comprising a category of a first product sales site matched, based on the matching information, to a category of a second product sales site preferred by a specific user, and providing the recommendation result information to a user terminal of the specific user connecting to the first product sales site.

10. The method of claim 9, wherein creating the matching information comprises, for each category of a product sales site, excluding categories of the same product sales site and matching the category to one or more categories of a different product sales site having the highest similarity.

11. A system for cross-recommendation between online product sales sites, the system comprising:

a plurality of affiliated store servers, each affiliated store server configured to provide a respective product sales site that is a web site to a user terminal of a user, collect behavior log information according to use of the product sales site by the user, and transmit the behavior log information, wherein the plurality of affiliated store servers provide different product sales sites; and a service providing apparatus comprising one or more processors and memory storing instructions thereon that, when executed by the one or more processors, cause the one or more processors to:

collect the behavior log information of a plurality of users for each of the different product sales sites by communicating with the plurality of affiliated store servers;

group items of the behavior log information into log groups such that each log group comprises behavior log information corresponding to a common user and a common category of a product sales site;

calculate a category point for each log group by applying event types included in the behavior log information of the log group to a first algorithm that assigns a respective weight to each event type;

create, for each log group, category preference information comprising category identification information identifying the user, the product sales site, and the category corresponding to the log group, and the category point;

calculate similarity between categories of different product sales sites by applying a second algorithm to the category preference information created for a plurality of users;

create matching information in which categories of different product sales sites are matched to each other based on the similarity; and generate recommendation result information comprising a category of a first product sales site matched, based on the matching information, to a category of a second product sales site preferred by a specific user, and provide the recommendation result information to a user terminal of the specific user connecting to the first product sales site.

12. The system of claim 11, wherein the instructions further cause the one or more processors to create the matching information by, for each category of a product sales site, excluding categories of the same product sales site and matching the category to one or more categories of a different product sales site having the highest similarity.

* * * * *